US012056589B2

(12) United States Patent
Popov et al.

(10) Patent No.: US 12,056,589 B2
(45) Date of Patent: *Aug. 6, 2024

(54) METHODS AND SYSTEMS FOR ACCURATELY RECOGNIZING VEHICLE LICENSE PLATES

(71) Applicant: INTELLIVISION TECHNOLOGIES CORP, San Jose, CA (US)

(72) Inventors: Ilya Popov, Nizhny Novgorod (RU); Chandan Gope, Cupertino, CA (US)

(73) Assignee: INTELLIVISION TECHNOLOGIES CORP, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/156,874

(22) Filed: Jan. 19, 2023

(65) Prior Publication Data

US 2023/0153698 A1    May 18, 2023

Related U.S. Application Data

(60) Division of application No. 16/888,026, filed on May 29, 2020, now Pat. No. 11,587,327, which is a
(Continued)

(51) Int. Cl.
*G06N 20/10* (2019.01)
*G06F 18/2411* (2023.01)
(Continued)

(52) U.S. Cl.
CPC ......... *G06N 20/10* (2019.01); *G06F 18/2411* (2023.01); *G06N 3/047* (2023.01);
(Continued)

(58) Field of Classification Search
None
See application file for complete search history.

(56) References Cited

U.S. PATENT DOCUMENTS 5,315,664 A    5/1994   Kumagai
6,026,177 A    2/2000   Lee et al.
(Continued)

FOREIGN PATENT DOCUMENTS

CN    101339601    1/2009
CN    101937508    7/2012
(Continued)

OTHER PUBLICATIONS

B. Li, B. Tian, Y. Li and D. Wen, "Component-Based License Plate Detection Using Conditional Random Field Model," in IEEE Transactions on Intelligent Transportation Systems, vol. 14, No. 4, pp. 1690-1699, Dec. 2013, doi: 10.1109/TITS.2013.2267054.*

(Continued)

*Primary Examiner* — Jiangeng Sun
(74) *Attorney, Agent, or Firm* — Fox Rothschild LLP

(57) ABSTRACT

Systems can be configured for detecting license plates and recognizing characters in license plates. In an example, a system can receive an image and identify one or more regions in the image that include a license plate. Character recognition can be performed in the one or more regions to determine contents of a candidate license plate. Location-specific information about a license plate format can be used together with the determined contents of the candidate license plate to determine if the recognized characters are valid.

19 Claims, 10 Drawing Sheets

Related U.S. Application Data continuation-in-part of application No. 15/265,026, filed on Sep. 14, 2016, now Pat. No. 10,706,330.

(60) Provisional application No. 62/235,583, filed on Oct. 1, 2015.

(51) Int. Cl.
| | | |
|---|---|---|
| *G06N 3/047* | (2023.01) | |
| *G06V 10/75* | (2022.01) | |
| *G06V 10/82* | (2022.01) | |
| *G06V 20/00* | (2022.01) | |
| *G06V 20/54* | (2022.01) | |
| *G06V 20/62* | (2022.01) | |
| *G06V 30/10* | (2022.01) | |
| *G06V 30/18* | (2022.01) | |
| *G06V 30/19* | (2022.01) | |

(52) U.S. Cl.
CPC ............ *G06V 10/758* (2022.01); *G06V 10/82* (2022.01); *G06V 20/00* (2022.01); *G06V 20/54* (2022.01); *G06V 20/63* (2022.01); *G06V 30/18086* (2022.01); *G06V 30/19147* (2022.01); *G06V 30/19173* (2022.01); *G06V 20/625* (2022.01); *G06V 30/10* (2022.01)

(56) References Cited

U.S. PATENT DOCUMENTS

| | | |
|---|---|---|
| 6,473,517 B1 | 10/2002 | Tyan et al. |
| 6,553,131 B1 | 4/2003 | Neubauer et al. |
| 8,059,868 B2 | 11/2011 | Matsumoto et al. |
| 8,320,629 B2 | 11/2012 | Hofman et al. |
| 8,731,244 B2 | 5/2014 | Wu |
| 8,792,682 B2 | 7/2014 | Fan et al. |
| 8,965,123 B2 | 2/2015 | Chattopadhyay et al. |
| 9,092,892 B2 | 7/2015 | Ozawa et al. |
| 9,141,926 B2 * | 9/2015 | Kilby ............... G06Q 40/08 |
| 9,292,759 B2 | 3/2016 | Burry et al. |
| 9,400,936 B2 | 7/2016 | Bulan et al. |
| 9,547,800 B2 | 1/2017 | Besiris et al. |
| 10,706,330 B2 | 7/2020 | Gope et al. |
| 11,587,327 B2 | 2/2023 | Popov et al. |
| 2005/0029347 A1 | 2/2005 | Noble et al. |
| 2009/0207046 A1 | 8/2009 | Arrighetti |
| 2012/0275653 A1 | 11/2012 | Hsieh et al. |
| 2013/0148857 A1 | 6/2013 | Yoon et al. |
| 2013/0182910 A1 * | 7/2013 | Burry ............... G06F 18/243 382/105 |
| 2013/0259314 A1 | 10/2013 | Kozitsky et al. |
| 2014/0376778 A1 | 12/2014 | Muetzel et al. |
| 2015/0063688 A1 * | 3/2015 | Bhardwaj ............... G06T 11/60 382/159 |
| 2016/0203380 A1 * | 7/2016 | Bulan ............... G06V 30/19173 382/105 |
| 2017/0300786 A1 | 10/2017 | Gope et al. |
| 2020/0293794 A1 | 9/2020 | Popov et al. |

FOREIGN PATENT DOCUMENTS

| | | |
|---|---|---|
| CN | 102043945 | 1/2013 |
| CN | 103106402 | 5/2013 |
| CN | 103870803 | 6/2014 |
| CN | 104050450 | 9/2014 |
| CN | 104239864 | 12/2014 |
| CN | 104268509 | 1/2015 |
| CN | 104298976 | 1/2015 |
| CN | 104732227 | 6/2015 |
| CN | 103065138 | 7/2015 |
| DE | 102005062154 | 7/2007 |
| WO | 2014193220 | 12/2014 |
| WO | WO-2015184899 A1 * | 12/2015 ............... G06K 9/20 |

OTHER PUBLICATIONS

"U.S. Appl. No. 15/265,026, Examiner Interview Summary mailed May 22, 2018", 3 pgs.

"U.S. Appl. No. 15/265,026, Non Final Office Action mailed Jan. 11, 2018", 12 pgs.

"U.S. Appl. No. 15/265,026, Response filed May 18, 2018 to Non-Final Office Action mailed Jan. 11, 2018", 19 pgs.

"U.S. Appl. No. 15/265,026, Final Office Action mailed Jul. 24, 2018", 18 pgs.

"U.S. Appl. No. 15/265,026, Preliminary Amendment filed Oct. 17, 2016", 4 pgs.

"U.S. Appl. No. 15/265,026, Preliminary Amendment filed May 23, 2017", 3 pgs.

"U.S. Appl. No. 15/265,026, Final Office Action mailed Sep. 23, 2019", 16 pgs.

"U.S. Appl. No. 15/265,026, PTO Response to Rule 312 Communication mailed May 5, 2020", 2 pgs.

"U.S. Appl. No. 15/265,026, Notice of Allowance mailed Feb. 25, 2020", 7 pgs.

"U.S. Appl. No. 15/265,026, Response filed Oct. 24, 2018 to Final Office Action mailed Jul. 24, 2018", 17 pgs.

"U.S. Appl. No. 15/265,026, Non Final Office Action mailed Jan. 18, 2019", 16 pgs.

"U.S. Appl. No. 15/265,026, Examiner Interview Summary mailed Jul. 16, 2019", 3 pgs.

"U.S. Appl. No. 15/265,026, Response filed Jul. 18, 2019 to Non Final Office Action mailed Jan. 18, 2019", 19 pgs.

"U.S. Appl. No. 15/265,026, Response filed Oct. 29, 2019 to Final Office Action mailed Sep. 23, 2019", 24 pgs.

"U.S. Appl. No. 15/265,026, Examiner Interview Summary mailed Oct. 24, 2019", 3 pgs.

"U.S. Appl. No. 15/265,026, 312 Amendment filed Apr. 22, 2020", 4 pgs.

"U.S. Appl. No. 16/888,026, Restriction Requirement mailed Jan. 12, 2022", 5 pgs.

"U.S. Appl. No. 16/888,026, Response filed Jan. 19, 2022 to Restriction Requirement mailed Jan. 12, 2022", 8 pgs.

"U.S. Appl. No. 16/888,026, Non Final Office Action mailed Feb. 15, 2022", 13 pgs.

"U.S. Appl. No. 16/888,026, Response filed May 16, 2022 to Non Final Office Action mailed Feb. 15, 2022", 14 pgs.

"U.S. Appl. No. 16/888,026, Final Office Action mailed May 27, 2022", 13 pgs.

"U.S. Appl. No. 16/888,026, Response filed Sep. 27, 2022 to Final Office Action mailed May 27, 2022", 16 pgs.

"U.S. Appl. No. 16/888,026, Notice of Allowance mailed Oct. 14, 2022", 10 pgs.

"U.S. Appl. No. 16/888,026, Corrected Notice of Allowability mailed Oct. 26, 2022", 2 pgs.

Ibrahim, Nuzulha Khilwano, "License Plate Recognition (LPR)", The International Journal of Soft Computing and Software Engineering [JSCSE], vol. 3, No. 3, Special Issue, (Mar. 2013), 11 pgs.

Kumari, Sangita, "A Robust Method for Vehicle License Plate Recognition based on Harries Corner Algorithm and Artificial Neural Network", International Journal of Computer Applications, (2013), 5 pgs.

Wen, Ying, "An Algorithm for License Plate Recognition Applied to Intelligent Transportation System", Intelligent Transportation Systems, IEEE Transactions vol. 12, No. 3, (Sep. 2011), 16 pgs.

* cited by examiner

METHODS AND SYSTEMS FOR ACCURATELY RECOGNIZING VEHICLE LICENSE PLATES

CLAIM OF PRIORITY

The instant application is a Division of U.S. patent application Ser. No. 16/888,026, filed on May 29, 2020, which is a Continuation-in-part of U.S. patent application Ser. No. 15/265,026, filed on Sep. 14, 2016, which application claims the benefit of priority of U.S. Provisional Patent Application Ser. No. 62/235,583, filed on Oct. 1, 2015, each of which is incorporated herein by reference in its entirety.

BACKGROUND

With rapid increase of vehicle sale/purchase, the automatic vehicle identification systems have become imperative for effective traffic control and security applications, such as detecting traffic violations and theft access control to restricted areas, tracking of wanted vehicles, and the like. The most common technique used by automatic vehicle identification systems is the number plate/license plate detection. In this technique, a plurality of regions of interest is identified in an image, and character segmentation is performed using feature extraction mechanisms.

The existing license plate detection techniques use gradient and edge information from one or more filters, along with a sliding window technique. An example of the one or more filters is Sobel. Additionally, a Hough transform based approach is employed. Typically, for representing characters, the existing license plate detection techniques use features such as scale-invariant feature transform (SIFT), Histogram of Gradients (HoG), or Haar-like. In some cases, the features have been supplemented with learning-based methods, such as Support Vector Machine (SVM), Boosting, and the like. A major disadvantage of the existing license plate detection techniques is the complexity and the computational burden which results in inaccurate character recognition. As the number of images to be analyzed increases, the mechanisms used by the existing license plate detection techniques cannot match up the desired processing speed. Another disadvantage is that the techniques rely on a single learning model. This model is not sufficient to identify license plate formats across countries, or even within states. Further, the techniques cannot accurately recognize characters in low lighting or visibility conditions. Examples include the change of light in day and night, change of weather, and the like. In addition, if the input image/video has low resolution, the character recognition becomes challenging. Therefore, there is a need for an accurate and computationally efficient solution for solving the problem of license plate identification and character recognition.

SUMMARY

In an example, a license plate detection and recognition (LPDR) system comprises of a processor, a non-transitory storage element coupled to the processor and encoded instructions stored in the non-transitory storage element. The encoded instructions when implemented by the processor, configure the LPDR system to detect and recognize license plates in an image. The LPDR system includes an image input unit, a license plate detection unit, a character detection unit, and a character recognition unit. The license plate detection unit further includes a binarization unit and a filtration unit. The image input unit is configured to receive an image, wherein the image input unit receives the image from at least one of an image capturing device, a network, a computer and a memory unit. The license plate detection unit is configured to detect one or more regions in the image, wherein a region of the one or more regions includes a license plate. Further, the binarization unit of the license plate detection unit is configured to generate a set of binarized images of the region using at least one of a multi-scale difference of Gaussian filter and a variable adaptive threshold (T). The variable adaptive threshold (T) is computed based on at least one parameter of a set of parameters computed locally in a window centered at a location in the region. In addition, the filtration unit of the license plate detection unit is configured to remove noise from a binarized image of the set of binarized images based on at least one of a horizontal profile and a vertical profile of the binarized image. Next, the character detection unit is configured to detect one or more clusters of characters in the binarized image based on at least one cluster constraint of the group comprising number of characters, size and orientation of characters, spacing between characters, aspect ratio and slope of characters.

In an example, a computer programmable product can be configured for detecting a region containing a license plate and, detecting and recognizing a set of characters in the region. The computer programmable product is a part of a license plate detection and recognition (LPDR) system. The computer programmable product includes a set of instructions that when executed by a processor of the LPDR system cause the LPDR system to receive an image, wherein the image is received from at least one of an image capturing device, a network, a computer and a memory unit. Next, the computer programmable product detects one or more regions in the image, wherein a region of the one or more regions includes a license plate. For detection, a set of binarized images of the region is generated using at least one of a multi-scale difference of Gaussian filter and a variable adaptive threshold (T), wherein the variable adaptive threshold (T) is computed based on at least one parameter of a set of parameters computed locally in a window centered at a location in the region. Thereafter, noise is removed from a binarized image of the set of binarized images based on at least one of a horizontal profile and a vertical profile of the binarized image. Further, the computer programmable product detects one or more clusters of characters in the binarized image based on at least a cluster constraint of the group comprising number of characters, size and orientation of characters, spacing between characters and slope of characters. A set of characters is recognized from the detected one or more clusters of characters, wherein a character of the set of characters is associated with a confidence value.

In an example, a method for detecting and recognizing a license plate in an image includes receiving an image from at least one of an image capturing device, a network, a computer and a memory unit. Next, one or more regions in the image are detected, wherein a region of the one or more regions includes a license plate. For detection, a set of binarized images of the region is generated using at least one of a multi-scale difference of Gaussian filter and a variable adaptive threshold (T), wherein the variable adaptive threshold (T) is computed based on at least one parameter of a set of parameters computed locally in a window centered at a location in the region. Thereafter, noise is removed from a binarized image of the set of binarized images based on at least one of a horizontal profile and a vertical profile of the binarized image. The method further includes detecting one or more clusters of characters in the binarized image based on at least a cluster constraint of the group comprising number of characters, size and orientation of characters, spacing between characters and slope of characters. A set of characters is recognized from the detected one or more clusters of characters, wherein a character of the set of characters is associated with a confidence value.

In an example, an LPDR system can be configured to generate one or multiple candidate license plates based on images or frames from a camera. In an example, the system can include a processor-implemented license plate region detection unit configured to identify a first region in a first received image, the first region corresponding to a license plate of a vehicle. The first received image can be obtained from an image capture device located in a first geographic location. The system can further include a processor-implemented character identification unit configured to identify one or more alphanumeric characters in the first region of the first received image. The system can further include a processor-implemented plate build unit configured to generate a candidate license plate using the identified one or more alphanumeric characters from the character identification unit. In an example, the plate build unit can be configured to generate the candidate license plate using a location-specific template that corresponds to the first geographic location.

BRIEF DESCRIPTION OF DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present invention will now be described more fully with reference to the accompanying drawings, in which embodiments of the present invention are shown. However, this invention should not be construed as limited to the embodiments set forth herein. Rather, these embodiments are provided so that this invention will be thorough and complete, and will fully convey the scope of the present invention to those skilled in the art. Like numbers refer to like elements throughout.

The present disclosure describes devices/machines/systems configured to identify a vehicle license plate in an image and recognize the characters in the license plate. Here, the image is processed to identify one or more regions that include a license plate. Next, one or more clusters of characters are identified in each of the one or more regions, wherein the identification is made based on at least one of number of characters, size and orientation of characters, spacing between characters, aspect ratio and slope of characters. Finally, each character in the one or more clusters is recognized.

Exemplary Environment

Figure 1:
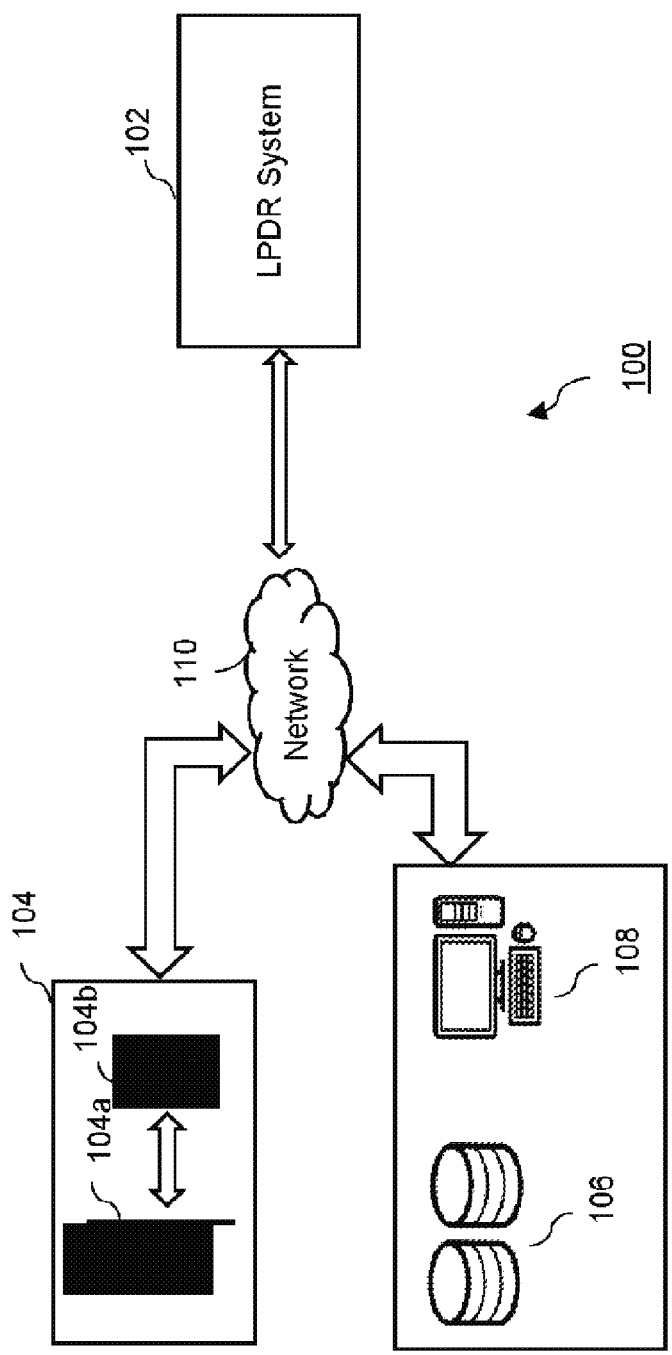
FIG. 1 illustrates an exemplary environment in which various embodiments of the present invention can be practiced.

FIG. 1 illustrates an exemplary environment 100 in which various embodiments of the present invention can be practiced. The environment 100 includes a License Plate Detection and Recognition (LPDR) system 102, a real-time streaming system 104, a video/image archive 106, and a computer system 108. The real-time streaming system 104 includes a video server 104a, and one or a plurality of video/image capturing devices 104b installed across multiple locations. Examples of locations include, but are not limited to, roads, parking spaces, garages, toll booths, outside residential areas, outside office spaces, outside public places (such as malls, recreational areas, museums, libraries, hospitals, police stations, fire stations, schools, colleges), and the like. The video/image capturing devices 104b include, but are not limited to, Closed-Circuit Television (CCTVs) cameras, High Definition (HD) cameras, non-HD cameras, handheld cameras, or any other video/image grabbing units. The video server 104a of the real-time streaming system 104 receives a dynamic imagery or video footage from the video/image capturing devices 104b, and transmits the associated data to the LPDR system 102. The video/image archive 106 is a data storage that is configured to store pre-recorded or archived videos/images. The video/image archive 106 may be composed of a plurality of local databases or remote databases. Also, the databases may be centralized and/or distributed. In an alternate scenario, the video/image archive 106 may store data using a cloud-based scheme. Similar to the real-time streaming system 104, the video/image archive 106 transmits data to the LPDR system 102. The computer system 108 is any local computing device or computing device remotely located from the LPDR system 102, and stores a plurality of videos/images in its memory. In an embodiment, the computer system 108 can be replaced by one or more of a computing server, a mobile device, a memory unit, and a handheld device. The real-time streaming system 104, the video/image archive 106, the computer system 108 and the LPDR system 102 are connected over a network 110. In an embodiment of the present invention, the real-time streaming system 104 and/or the computer system 108 may also send data (input frames) to the video/image archive 106 for storage and subsequent retrieval.

The network 110 may be any suitable wired network, wireless network, a combination of these or any other conventional network, without limiting the scope of the present invention. Examples of the network 110 may include a LAN or wireless LAN connection, an Internet connection, a point-to-point connection, or other network connection and combinations thereof. The network 110 may be any other type of network that is capable of transmitting or receiving data to/from host computers, personal devices, telephones, video/image capturing devices, video/image servers, or any other electronic devices. Further, the network 110 is capable of transmitting/sending data between the mentioned devices. Additionally, the network 110 may be a local, regional, or global communication network, for example, an enterprise telecommunication network, the Internet, a global mobile communication network, or any combination of similar networks. The network 110 may be a combination of an enterprise network (or the Internet) and a cellular network, in which case, suitable systems and methods are employed to seamlessly communicate between the two networks. In such cases, a mobile switching gateway may be utilized to communicate with a computer network gateway to pass data between the two networks. The network 110 may include any software, hardware, or computer applications that can provide a medium to exchange signals or data in any of the formats known in the art, related art, or developed later.

The LPDR system 102 can be part of at least one of a surveillance system, a security system, a traffic monitoring system, a home security system and a toll fee system. The LPDR system 102 can be configured to receive data from the real-time streaming system 104, the video/image archive 106, and/or the computing system 108. The data can be in form of one or more video streams and/or one or more images. In case of the one or more video streams, the LPDR system 102 converts each stream into a plurality of static images or frames.

In an example, the LPDR system 102 can be configured to process the one or more received images (or static image frames of videos) and execute a license plate detection technique. In the detection technique, the one or more images are analyzed and one or more regions containing vehicle license plates are detected. Next, for each license plate, the LPDR system 102 can be configured to recognize the characters that make up the vehicle license/registration number. In an example, the LPDR system 102 is configured to take into account lighting and visibility conditions while performing character recognition.

In some examples, geographical information or considerations can be applied to aid in license plate recognition or validation. License plates of a plurality of countries, states, or other areas, can be considered. In an example, the LPDR system 102 can be configured to perform post-processing such as can include temporal based logic. The logic can be configured to perform a location-based format validation, for example because permissible character layout can vary among countries, states, regions, or for other reasons. Various details of the LPDR system 102 are explained herein.

Exemplary LPDR System

Figure 2:
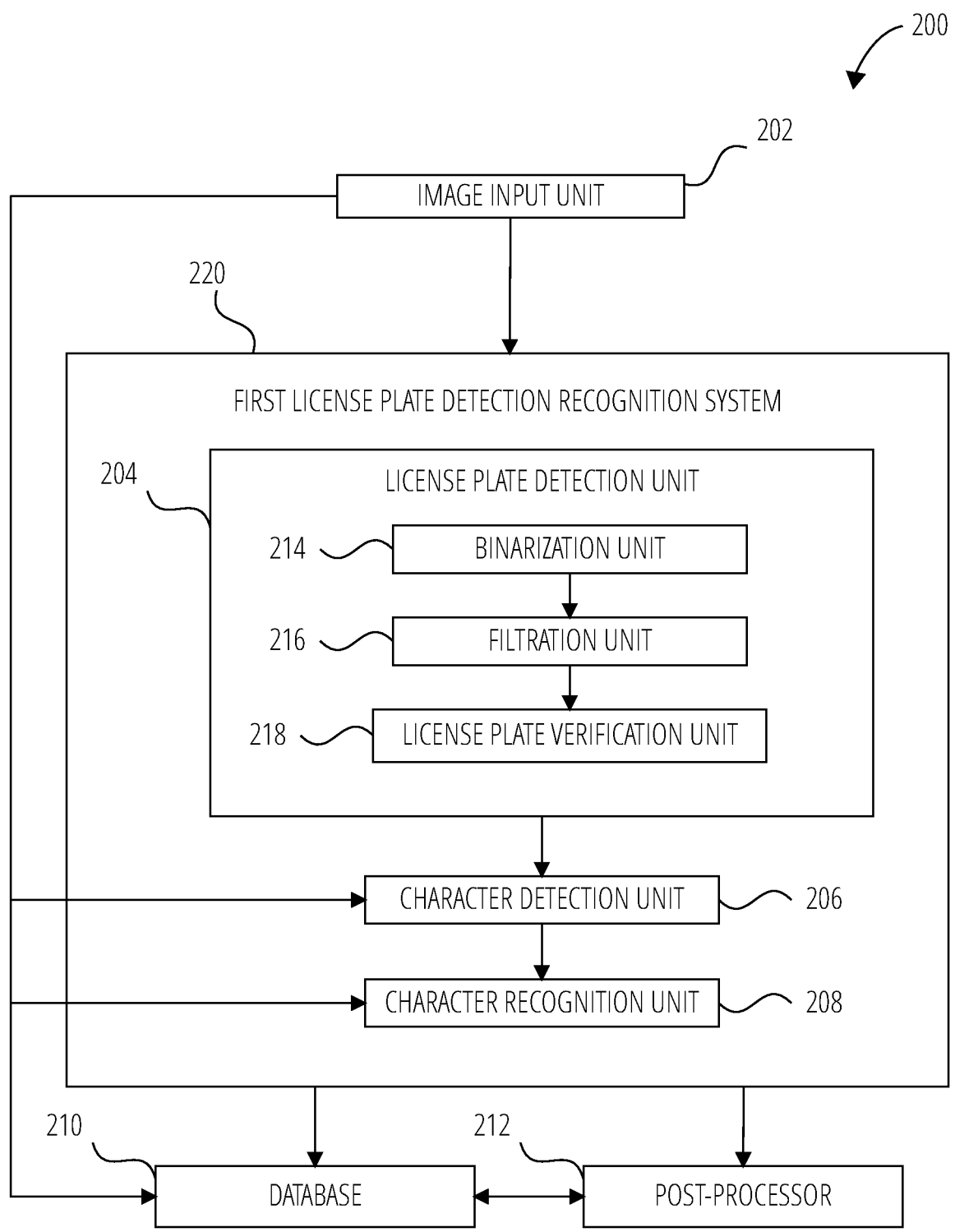
FIG. 2 illustrates generally a first example of a License Plate Detection and Recognition system.

FIG. 2 illustrates generally a first example 200 that includes a first license plate detection and recognition system, or first LPDR 220. The example of the first LPDR 220 includes a plurality of units, including a license plate detection unit 204, a character detection unit 206, and a character recognition unit 208. The license plate detection unit 204 can include a binarization unit 214, a filtration unit 216, and a license plate verification unit 218. The first example 200 of FIG. 2 includes an image input unit 202, a database 210, and a post-processor 212. The various units 204-218 can be configured to send data or receive data to/from each other by means of wired or wireless connections. In an example, one or more of the units can be remotely located from one or more of the other units. For example, the database 210 may be hosted remotely from the first LPDR 220, and the connection to the database 210 can be established using one or more wired/wireless connections.

The image input unit 202 can be configured to receive data from at least one of the real-time streaming system 104, the video/image archive 106, and the computer system 108. The received data can include at least one image such as captured by the video/image capturing devices 104b. In an example, the data corresponds to an image previously stored in the video/image archive 106 or the computer system 108.

Figure 4:
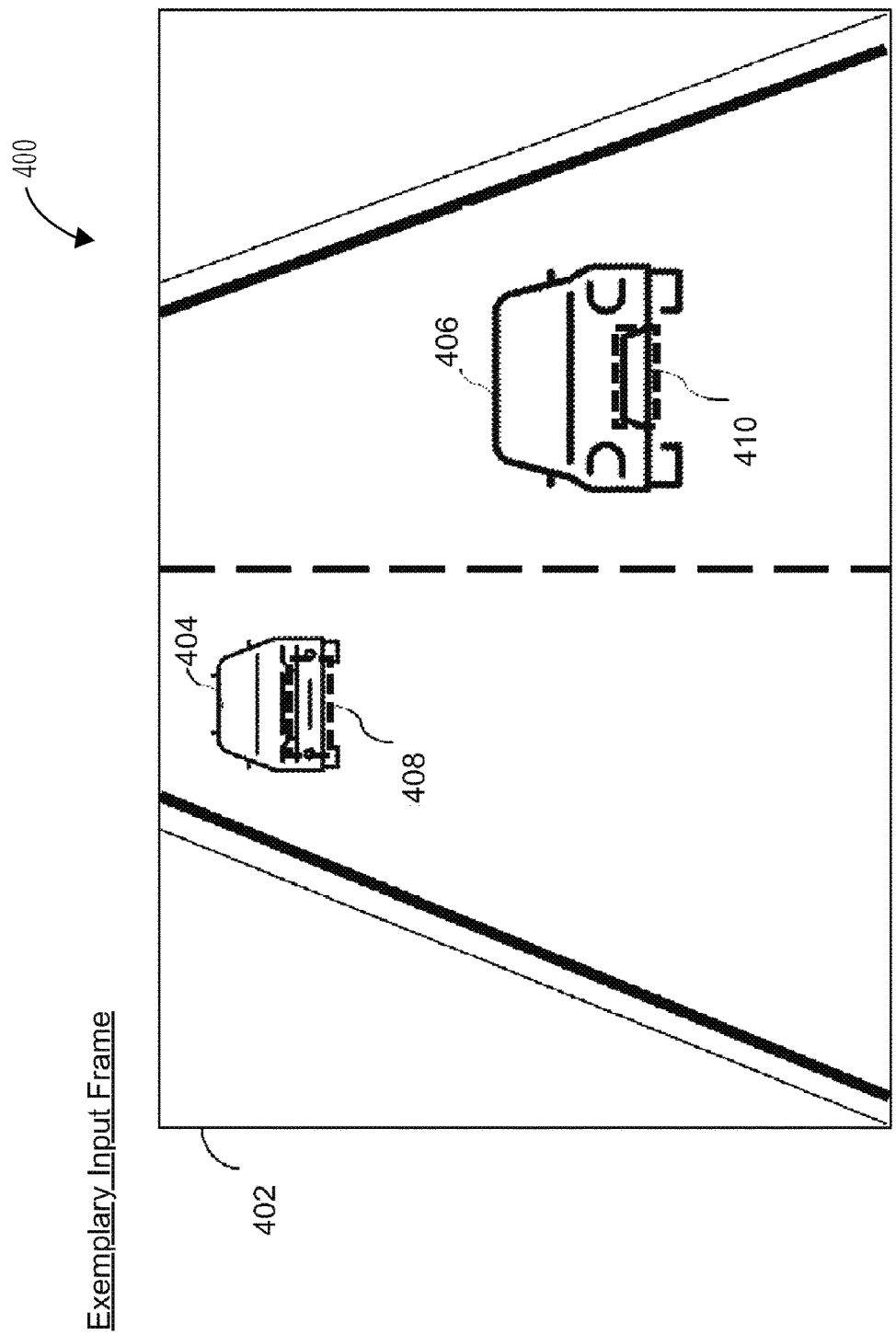
FIG. 4 illustrates an exemplary input frame.

The image input unit 202 can be configured to send an image to the license plate detection unit 204. The license plate detection unit 204 can be configured to analyze the image to identify one or more vehicles, and then one or more regions such that each region includes a license plate. With reference to FIG. 4, an image 402 can be received by the image input unit 202, and can be transferred to the license plate detection unit 204.

In an example, the license plate detection unit 204 can scan the image 402 to identify one or more vehicles in the image 402. The one or more vehicles can have various forms such as two-wheelers, three-wheelers, and four-wheelers, among others. The vehicles may also be heavy vehicles, such as buses, trucks and/or any other vehicle having a license plate. In the example of FIG. 4, the one or more vehicles can include a first vehicle 404 and a second vehicle 406. The identification of the one or more vehicles can be based on a shape or size of the vehicles, or on relative motion between frames, or via other means.

In an example, if the image input unit 202 receives a video stream (e.g., instead of an image), the video stream can be divided into a sequence of frames and sent to the license plate detection unit 204. The license plate detection unit 204 can be configured to analyze the sequence of frames and, for example, use object tracking to track one or more vehicles based on at least one of their shape, size, orientation, and motion. The motion of a vehicle determines an expected location of the vehicle in a frame, such that the expected location of the vehicle is estimated based on speed and location of the vehicle in a previous frame.

In an example, the license plate detection unit 204 can use a Haar and Adaboost based cascade detector to detect one or more vehicles in an image. In an example, the license plate detection unit 204 can use a deformable part-based model to detect one or more vehicles in an image. In an example, the license plate detection unit 204 can run or perform a selective search based algorithm to first find a plurality of object regions in the image. The plurality of object regions can then be scanned using a Histogram of Gradients (HoG) and/or Support Vector Machine (SVM) based classifier to detect the one or more vehicles in the plurality of object regions.

Once the one more vehicles are identified in the image, the license plate detection unit 204 can be configured to detect one or more regions associated with each detected vehicle, such as including regions within, on, or near the one or more detected vehicles. In an example, each of the one or more regions can include a license plate. License plates detected in the image may be of different sizes or orientations. In the example of FIG. 4, the one or more regions correspond to a first region 408 corresponding to the first vehicle 404, and a second region 410 corresponding to the second vehicle 406. For this, the license plate detection unit 204 can use one or more region selection strategies to select the one or more regions that prospectively include one or more license plates. If the image corresponds to an image of a plurality of vehicles at a toll-booth, the number of regions (that likely include license plates) is large, for example within a range of 500-5000. However, if the image corresponds to a relatively less busy intersection of a road, the number of regions is less. Therefore, the range may vary from image to image.

In an embodiment, the license plate verification unit 218 analyzes the one or more regions to further narrow these down to a more accurate set of one or more regions that may contain a license plate. This analysis is made by analytically evaluating each region of the one or more regions to detect contours or connected components based on at least one of shape, size, orientation, color, edges, and high transition in edges in various directions, such as in horizontal and vertical directions. For example, if a rectangular shape is detected in a region, the region is selected. In an example, the license plate verification unit 218 uses machine learning strategies. An example of the machine learning strategies can include an HoG+SVM classifier.

Once the one or more regions are identified, the binarization unit 214 of the license plate detection unit 204 can be configured to generate a set of binarized images for each region or portion of the one or more regions. The binarized images are generated using at least one of a multi-scale Difference of Gaussian (DoG) filter and a Variable Adaptive Threshold (VAT). When the DoG filter is used, a plurality of Gaussian kernels is employed to create a plurality of binarized images corresponding to each region of the one or more regions. In case of the VAT, a threshold value T is calculated based on a plurality of statistical measures or parameters of pixel intensity. The statistical measures can include, but are not limited to, mean, median, mode, standard variance, and the like. For a region of the one or more regions (containing one or more license plates), the threshold T is computed locally in a window centered at a location in the region. The threshold T is a measure of any of the plurality of statistical measures. In an example, the threshold T is a value that optimizes one or more criteria. An example of the one or more criteria includes, but is not limited to, inter-class variance. Using the VAT technique, the binarization unit 214 creates a list of thresholds, wherein the list of thresholds comprises N values in the range of $\{f^*T, g^*T\}$, where $f<1$ and $g>1$. The N values correspond to the set of binarized images for each of the one or more regions.

The set of binarized images is sent to the filtration unit 216 of the license plate detection unit 204. The filtration unit 216 can be configured to process the set of binarized images to remove noise. An example of noise includes, but is not limited to, non-character data on the boundaries of license plates. Essentially, the set of binarized images may contain noise around the one or more license plates, and/or noise around the sequence of characters within the one or more license plates. To remove the noise, the filtration unit 216 applies a horizontal profile and a vertical profile on a binarized image of the set of binarized images. The horizontal and vertical profiles are generated based on one or more transition points identified by scanning the binarized image. Each of the one or more transition points represents one of a transition from black to white and a transition from white to black. For example, for the horizontal profile, while scanning the binarized image line by line horizontally, one or more pivot points are calculated as transition points of pixel values from 0-255 or 255-0. Accordingly, the horizontal and vertical profiles can be used to remove noise such as, but are not limited to, long horizontal edges at bottom of characters, small edges joining two or more characters, and the like. After the noise is removed, the filtration unit 216 can adjust the boundaries of the set of binarized images.

The character detection unit 206 is configured to receive the filtered binarized images corresponding to the one or more license plates, and detect one or more clusters of characters in each of the filtered binarized images. The detection can be made based on at least one cluster constraint, such as, but is not limited to, number of characters, size and orientation of characters, spacing between characters, aspect ratio and/or slope/alignment of characters. Further, the clusters may be identified by detecting and discarding one or more hyphens. The one or more hyphens can be detected by using one or more profiles in the horizontal and vertical direction. For the vertical direction, a window of a pre-determined small height and width is moved from top to bottom on the cluster of characters, and the corresponding pixel value is stored in a list. For the horizontal direction, a window of pre-determined long height and small width is moved horizontally, and the corresponding pixel value is again stored in the list. Using the pixel values the one or more hyphens are detected, and the one or more clusters of characters are detected. The one or more clusters of characters can be sent to the character recognition unit 208.

The character recognition unit 208 is configured to recognize a set of characters from the detected one or more clusters of characters. The set of characters together constitutes the license number. For recognizing characters in the English language, the set of numeric characters from 0-9 and alphabetical characters A-Z or a-z are considered. The character recognition unit 208 uses a classifier that is based on supervised and/or unsupervised machine learning. For the supervised machine learning, training data may use any of the classification models and/or regression models. In case of unsupervised learning, a new feature transformation is automatically learnt using an autoencoder neural network. The autoencoder neural network can include multiple hidden layers and can accept either the pixel data or one or more transformed representations of the pixel data as input. The problem of over-fitting can be avoided by regularizing the autoencoder neural network. Next, the autoencoder neural network is fine-tuned where class-labels are utilized to train the network. The final output layer of the network can be either a soft-max or any other classifier. Essentially, the autoencoder neural network provides a confidence value to each recognized character. Example, for a recognized character "K", a confidence value 99% may be associated post computation. In another example, for a recognized character "8", a confidence value 38% may be computed, wherein the low confidence value signifies that possibly the character "8" may also correspond to a character "B". The confidence value can be represented in a plurality of formats, such as, but not limited to, percentage, percentile, a whole number, a fraction, and the like.

In an example, the classifier of the character recognition unit 208 uses at least one of a geometric, photometric, and a noise transformation on a plurality of images to generate a large number of training images. The training images cover a plurality of variations, such as font types, font size, font style, and the like. These training images are then used for machine learning, both supervised and/or unsupervised. In an example, the character recognition unit 208 takes into account the lighting and visibility conditions while performing character recognition. The training images are transformed artificially to simulate a plurality of conditions, such as, but not limited to, visibility, lighting, noise and blur conditions. Using the training images, a machine learning model is built and applied while recognizing characters.

The set of recognized characters can be sent to the post-processor 212 for validation. The post-processor 212 can be configured to perform the validation based on at least one of spatial arrangement of characters, a frequency of occurrence of characters or a set of pre-determined rules. In case of the spatial arrangement of characters, the post-processor 212 performs a temporal validation by considering placement of the set of recognized characters across a plurality of image frames. The set of characters that denotes a different alignment or placement in a minority of frames, can be flagged as outliers and discarded.

In an example, temporal validation can be used to examine a frequency of occurrence of characters across a plurality of image frames. In this case, the set of characters is considered at various time intervals. For example, in a set of 10 images (containing one or more regions with one or more license plates), a recognized character was "B" in 6 out of 10 frames, and had a confidence value of 60%. For the remaining 4 frames, the character was recognized as "8" and had a confidence value of 95%. The post-processor 212 then computes a weighted probability for the two cases, such as using the formula:

(number of frames that recognized the character/total number of frames)*confidence value in percentage In the example of the character "B", the weighted probability is: (6/10)*(60/100)=0.36. For the character "8", the weighted probability is (4/10)*(95/100)=0.38. Based on the computed weighted probability, the character can be validated as "8" and not "B." Other weighted or unweighted formulas can similarly be used.

In an example, the post-processor 212 can use a set of pre-determined rules during validation. In an example, the pre-determined rules correspond to rules learnt via machine learning-based models. In an example, a machine learning-based model is built to learn a plurality of license plate formats in a particular location, such as in a particular geographic location, such as a particular country or region. According to an example model, the first character of a state's license plate format starts with only a number. However, if the character recognition unit 208 or the character extraction unit 306 recognizes the first character as a letter "I," then the post-processor 212 can use the example model to correct the character to number "1," since the probability of the character being "1" is greater than the probability of the character being "I."

A validated set of one or more recognized characters can be saved to the database 210. The set can be retrieved/accessed by one or more agents, users, or entities. Examples include, but are not limited to, law enforcement agents, traffic controllers, residential users, security personnel, and the like. The retrieval/access can be made by use of one or more devices. Examples of the one or more devices include, but are not limited to, smart phones, mobile devices/phones, Personal Digital Assistants (PDAs), computers, work stations, notebooks, mainframe computers, laptops, tablets, internet appliances, and any equivalent devices capable of processing, sending and receiving data.

In an example, a law enforcement agent accesses the LPDR system 102 using a mainframe computer. The law enforcement agent can input a license number on an interface of the mainframe computer. The input is then matched by the LPDR system 102 with the set of recognized characters stored in the database 210. If a match is found, then the image that corresponds to the matched characters is tracked, along with other supplementary information such as, but not limited to, a geo-tag, a time stamp, and the like. This way the law enforcement agent can track the whereabouts of the vehicle with the required license number. In an example, a traffic controller monitors key traffic prone areas.

In case a vehicle violates a traffic rule (such as jumps a traffic light), the traffic controller makes note of the license number of the vehicle.

It may be understood that in an example, the units 202-220 may be in the form of hardware components, while in another embodiment, the units 202-220 may be in the form of software entities/modules. In an example, the units may be a combination of hardware and software modules. Further, the LPDR system 102 may be a part of at least one of a group comprising a mobile phone, a computer, a server, or a combination thereof.

Figure 3:
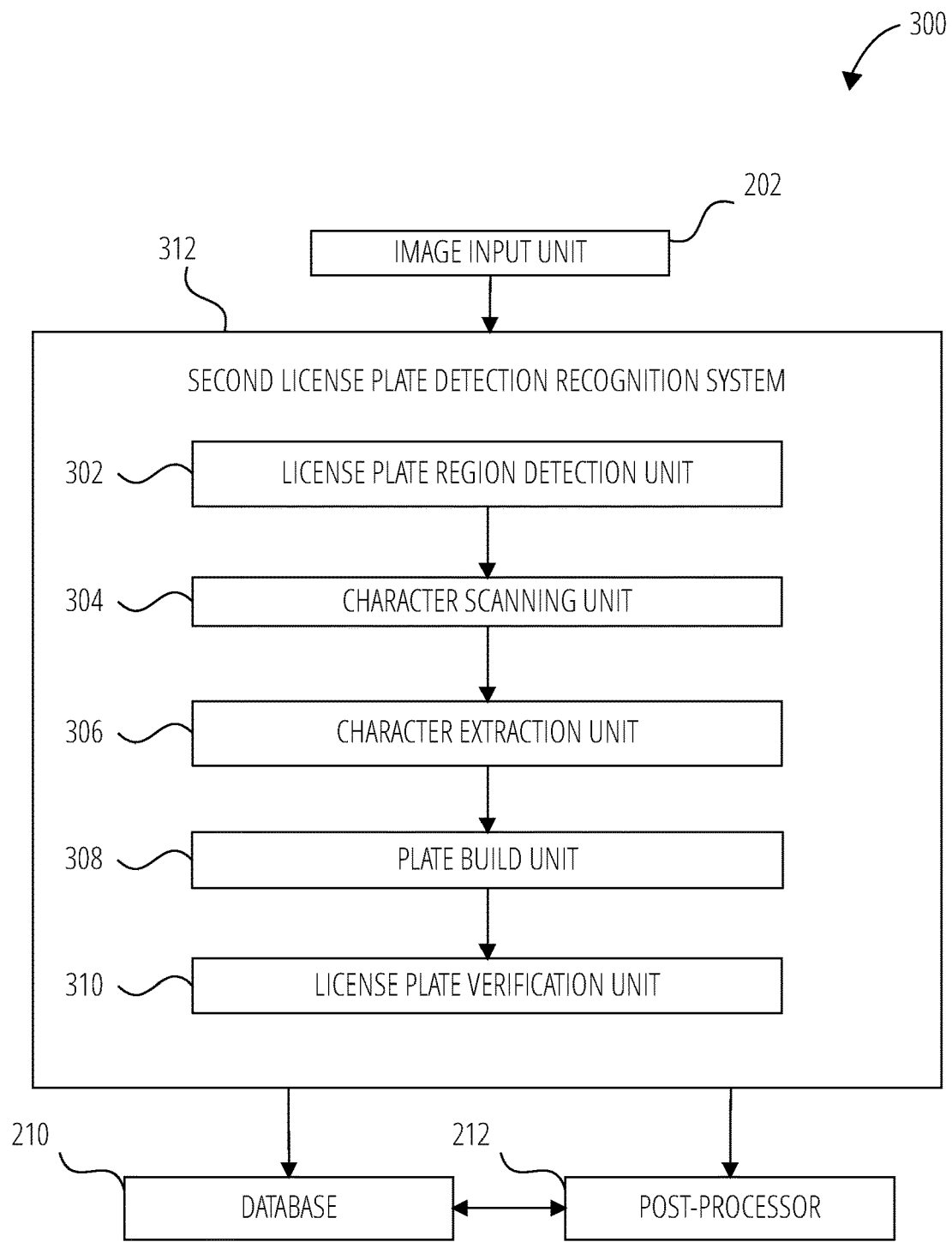
FIG. 3 illustrates generally a second example of a License Plate Detection and Recognition system.

FIG. 3 illustrates generally a second example 300 that includes a second license plate detection and recognition system, or second LPDR 312. The example of the second LPDR 312 can include a plurality of units, including a license plate region detection unit 302, a character scanning unit 304, a character extraction unit 306, a build plate unit 308, or a license plate verification unit 310. The second example 300 of FIG. 3 includes the image input unit 202, the database 210, and the post-processor 212, such as can be similarly or identically configured to the units as described above in the discussion of the first example 200 of FIG. 2. The various units 202, 210, 212, or 302-312 can be configured to send data or receive data to/from each other by means of wired or wireless connections. In an example, one or more of the units can be remotely located from one or more of the other units. For example, the database 210 may be hosted remotely from the second LPDR 312, and the connection to the database 210 can be established using one or more wired/wireless connections.

In an example, the image input unit 202 can be configured to send an image to the license plate region detection unit 302 in the second LPDR 312. The license plate region detection unit 302 can be configured to analyze the image to identify one or more vehicles, and then one or more regions corresponding to the one or more vehicles such that each region includes, or is likely to include, a license plate. With reference to FIG. 4, an image 402 of a scene can be received by the image input unit 202, and the image 402 can be transferred to the license plate region detection unit 302.

In an example, the license plate region detection unit 302 can be configured to identify candidate regions in an image from the image input unit 202. In an example, the license plate region detection unit 302 can include or can operate similarly to the license plate detection unit 204 from the example of FIG. 2, such as to scan all or a portion of the image 402 to identify one or more vehicles in the image 402. The one or more vehicles can have various forms or configurations, can include cars, trucks, motorcycles, or other vehicles, such as may or may not have respective corresponding license plates.

In the example of FIG. 4, the one or more vehicles can include a first vehicle 404 and a second vehicle 406. The identification of the one or more vehicles can be based on a shape or size of the vehicles, or on relative motion of vehicles or pixel clusters between frames, or via other means, such as similarly described above in the discussion of FIG. 2. For example, the license plate region detection unit 302 can use a Haar and Adaboost based cascade detector to detect one or more vehicles in an image. In an example, the license plate region detection unit 302 can use a deformable part-based model to detect one or more vehicles in an image. In an example, the license plate region detection unit 302 can run or perform a selective search-based algorithm to first find a plurality of object regions in the image. The plurality of object regions can then be scanned using a Histogram of Gradients (HoG) and/or Support Vector Machine (SVM) based classifier to detect the one or more vehicles in the plurality of object regions.

Once the one or more regions are identified by license plate region detection unit 302, the resulting region information can be provided to a character identification unit, such as can include the character scanning unit 304 and/or the character extraction unit 306. In an example, the character scanning unit 304 can process image information corresponding to regions identified by the license plate region detection unit 302, such as to further identify regions or sub-regions that include, or are likely to include, character information. The character scanning unit 304 can analyze one or more regions in an image using a sliding window and generate class information corresponding to the one or more regions. In an example, the character scanning unit 304 can use a convolutional neural network (CNN)-based classification algorithm to populate a matrix of character information for each region.

In an example, the character classification algorithm performed by the character scanning unit 304 can receive input pixels from an input window (e.g., a window of a specified or predefined size) and, in response, can populate the matrix with an array of normalized confidence indicators, such as using a softmax approach to emphasize differences. In an example, each value in the array can be related to a confidence of recognition of a character or a digit.

In an example, the character extraction unit 306 can perform a character extraction algorithm such as using class information from the character scanning unit 304. The character extraction unit 306 can be configured to group or cluster information from the character scanning unit 304 or to apply a threshold to matrix information or results from the character extraction unit 306.

In an example, a result or an output from the character scanning unit 304 or from the character extraction unit 306 can include an n-dimensional matrix of confidences (CONF_MAT) of approximately an input region size reduced at half of a window size, such as where n is a number of classes (e.g., characters or digits).

In an example, the character classification algorithm is configured or trained to yield positive results at various light levels or in different visibility conditions. In an example, the character classification algorithm is configured or trained to yield positive results at various angle, tilt, pan, roll, or rotation values of characters in the input images. Such robustness in the algorithm can be achieved by model training and/or learning, such as using a robust dataset of character images exhibiting the various different conditions. In an example, a training dataset can be enhanced by adding artificially generated characters such as can be prepared using rotation, dust, noise, intensity and/or color augmentation. In an example, depending on an availability of additional information about expected license plate sizes, single or multi-scale processing can be applied to further enhance or improve character recognition results from the character scanning unit 304 and/or the character extraction unit 306.

In an example, to compute the n-dimensional matrix of confidences CONF_MAT, the character scanning unit 304 can use a confidence threshold, CONF_THR. In an example, the confidence threshold can be selected based on a desired recognition sensitivity. In an example, a result of using the confidence threshold can include an n-dimension matrix with only values retained if they are above the specified threshold. In an example, the character extraction unit 306 can perform clusterization for each dimension or letter class in the matrix to identify clusters. For each cluster, an average or median confidence and area can be determined. If a particular area in a detected region has strong feedback only for a single class, then information about the recognized character and its location can be saved at the corresponding position. Otherwise, information about a number of candidate characters (e.g., top 3 characters, such as can be sorted in descending order of confidence) can be saved for the position.

Information about recognized characters and their respective positions or regions can be provided to the plate build unit 308. In an example, the plate build unit 308 can use information about positions of recognized classes or characters to build a license plate candidate, such as using assumptions that are valid for a given geographic location, region, country, state, or other plate-specific jurisdiction. In an example, the plate build unit 308 can include or use generic assumptions if a jurisdiction is not known or specified. The assumptions can include for example, a number or orientation of characters in a line, or in a stacked line form (e.g., up to some reasonable or specified angle), a total number of characters, and/or an expected or possible position for each of the characters. In an example, an output from the plate build unit 308 can include an array or grouped sequence of recognized characters with information about their respective locations or positions.

In an example, the plate build unit 308 or the post-processor 212 can be configured to apply one or more correction algorithms to help smooth a result from the plate build unit 308. For example, if a template applicable to a plate under examination indicates that a specified location should include a letter character rather than a numeric digit, then candidate letters for the specified location can be prioritized or indicated to have a greater confidence in the resulting candidate plate. In another example, if a plate pattern does not have a character at a designated position, then any data corresponding to such positions can be removed or discarded. Various other techniques can similarly be applied.

In an example, results from the plate build unit 308 can be provided to the license plate verification unit 310 and/or to the post-processor 212 for validation. The license plate verification unit 310 can be configured to perform the validation based on at least one of a spatial arrangement of characters, a frequency of occurrence of characters or a set of pre-determined rules, such as can be the same or different rules than those applied by the plate build unit 308. In an example that includes analyzing a spatial arrangement of characters, the license plate verification unit 310 can perform a temporal validation by considering placement of a set of recognized characters across a plurality of image frames. A set of characters that denotes a different alignment or placement in a minority of frames can optionally be flagged as outliers and discarded or further analyzed. In an example, the license plate verification unit 310 and/or to the post-processor 212 can use temporal validation techniques, such as described above in the discussion of FIG. 2, to examine a frequency of occurrence of characters across a plurality of image frames.

In an example, a validated set of one or more recognized characters, or a candidate plate or validated plate, can be saved to the database 210. The set or plate can be retrieved/accessed by one or more agents, users, or entities. Examples include, but are not limited to, law enforcement agents, traffic controllers, residential users, security personnel, and the like. The retrieval/access can be made by use of one or more devices. Examples of the one or more devices include, but are not limited to, smart phones, mobile devices/phones, Personal Digital Assistants (PDAs), computers, work stations, notebooks, mainframe computers, laptops, tablets, internet appliances, and any equivalent devices capable of processing, sending and receiving data.

In an example, a law enforcement agent accesses the LPDR system 102 using a mainframe computer. The law enforcement agent can input a license number on an interface of the mainframe computer. The input is then matched by the LPDR system 102 with the set of recognized characters stored in the database 210. If a match is found, then the image that corresponds to the matched characters is tracked, along with other supplementary information such as, but not limited to, a geo-tag, a time stamp, and the like. This way the law enforcement agent can track the whereabouts of the vehicle with the required license number. In an example, a traffic controller monitors key traffic prone areas. In case a vehicle violates a traffic rule (such as jumps a traffic light), the traffic controller makes note of the license number of the vehicle.

It may be understood that in an example, the units 302-312, 210, and/or 212, can be implemented in hardware or software. In an example, the units may be a combination of hardware and software modules. Further, the LPDR system 102 may be a part of at least one of a group comprising a mobile phone, a computer, a server, or a combination thereof.

Figure 6:
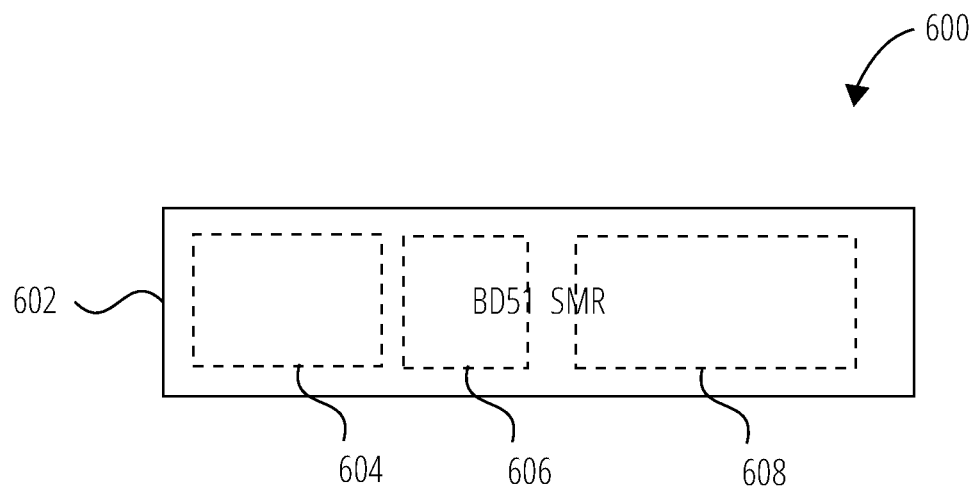
FIG. 6 illustrates an exemplary layout of a second license plate.
Figure 7:
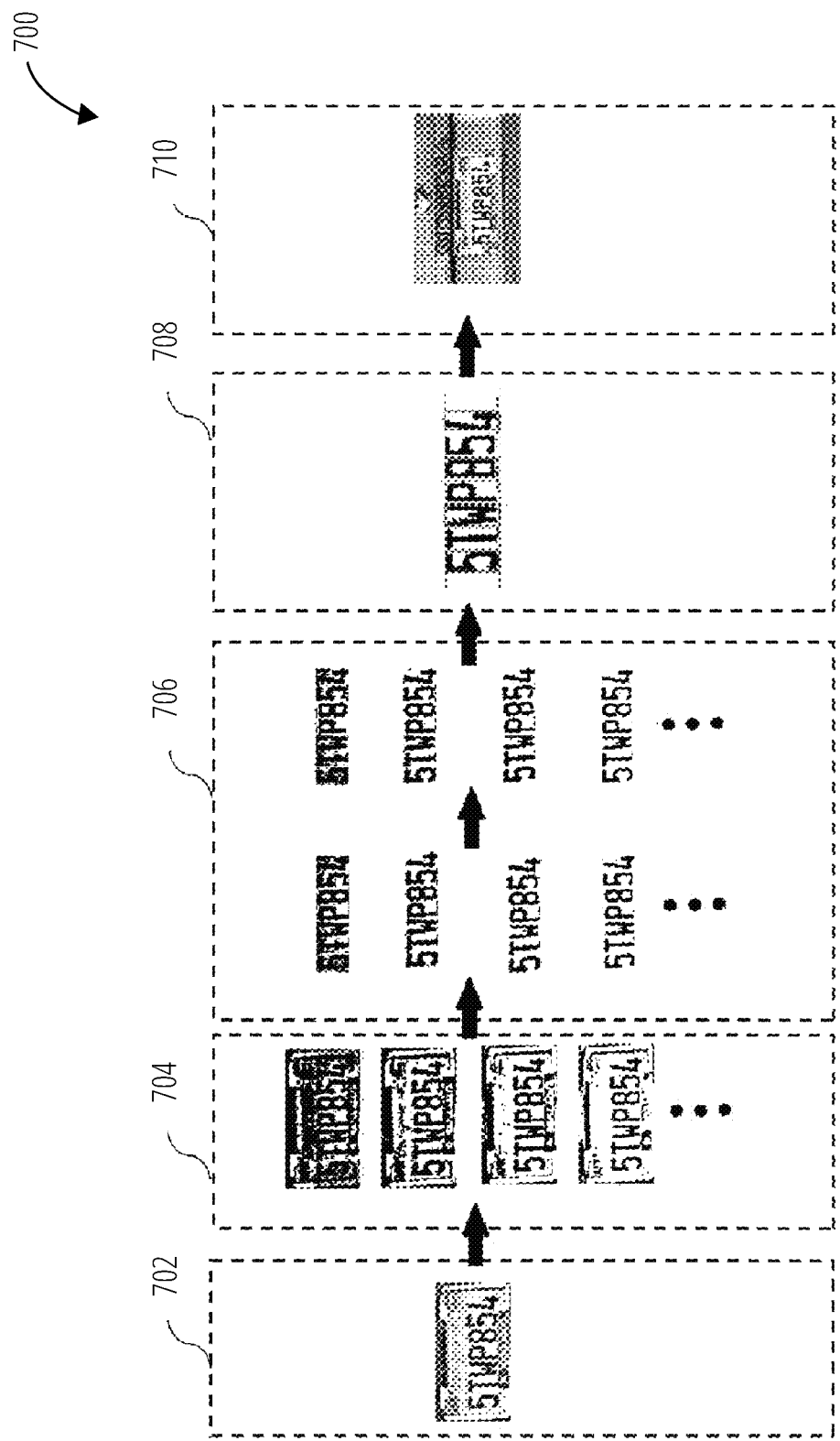
FIG. 7 illustrates a first example of a process for an LPDR system.
Figure 8:
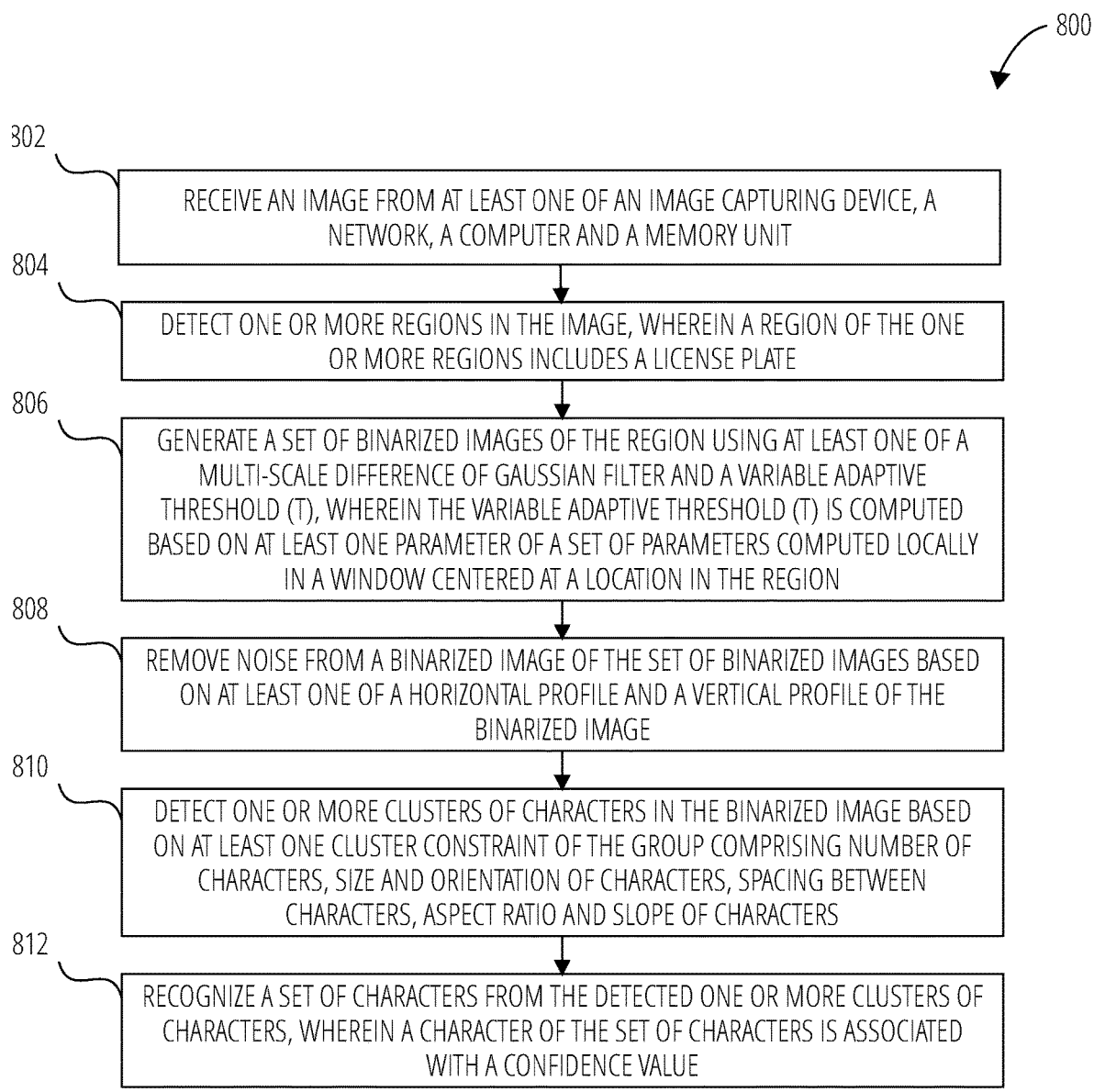
FIG. 8 illustrates an example of a first method for detecting and recognizing license plates.

FIG. 7 illustrates generally an example of a process for an LPDR system, such as can include or use the first example of a License Plate Detection and Recognition system from FIG. 2. FIG. 8 illustrates generally a first method 800 for detecting and recognizing license plates, such as using one or more of the systems, devices, or units discussed herein. The first method 800 will be discussed generally in conjunction with the examples of FIGS. 5-7.

At 802, the LPDR system 102 receives an image to be analyzed. The image is captured by one or more devices. The one or more devices include at least one of an image capturing device, a network, a computer and a memory unit. In an example, the one or more devices may transfer a video stream instead of an image. For such cases, the LPDR system 102 divides the video stream into a sequence of frames.

At 804, the LPDR system 102 detects one or more regions in the image, wherein a region of the one or more regions includes a license plate. For detecting the one or more regions, the LPDR system 102 first identifies one or more vehicles in the image based on at least one of their shape, size, orientation, and motion. The techniques used for vehicle identification can be implemented using a Haar and Adaboost based cascade detector, a deformable part based model, Histogram of Gradients (HoG) and/or Support Vector Machine (SVM) based classifier, and the like.

In an example, once the one or more vehicles are identified, the LPDR system 102 identifies the one or more regions that likely include one or more license plates. This identification is made by analytically detecting contours or connected components based on at least one of shape, size, orientation, color, edges, and high transition in edges in both horizontal and vertical direction. In FIG. 7, an example of the one or more regions is a region 702 that includes a license plate.

At 806, the region 702 is converted into a set of binarized images 704 using at least one of a multi-scale Difference of Gaussian (DoG) filter and a Variable Adaptive Threshold (VAT). In case of VAT, a threshold T is computed locally in a window centered at a location in the region 702. This computation is based on at least one parameter of a set of parameters including, but not limited to, mean, median, mode, standard variance, and the like. Next, at 808, the LPDR system 102 filters each binarized image of the set of binarized images 704 to remove noise based on at least one of a horizontal profile and a vertical profile of the binarized image. A noise is essentially non-character data on the boundaries on the license plate in the region 702. After noise removal, the set of binarized images 704 is converted to a set of filtered binarized images 706.

Figure 5:
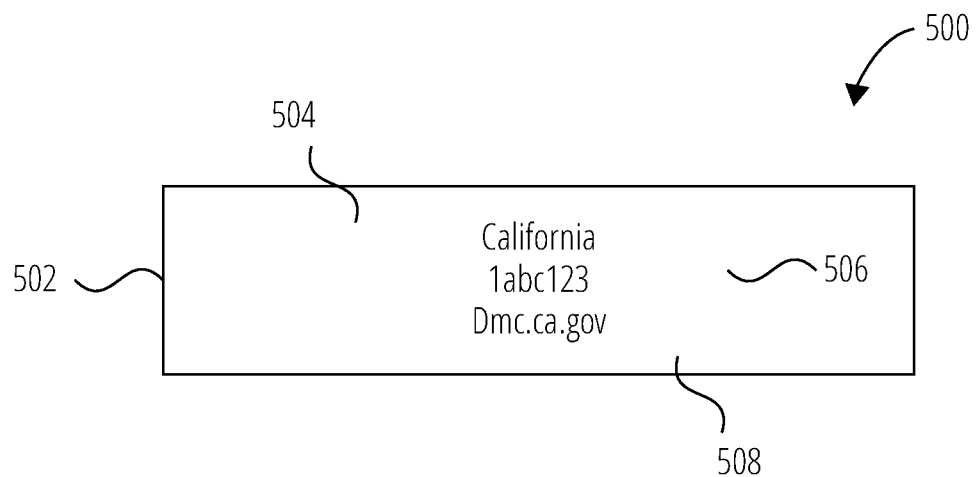
FIG. 5 illustrates an exemplary layout of a first license plate.

At 810, the LPDR system 102 detects one or more clusters of characters in the set of filtered binarized images 704 based on at least one cluster constraint. Examples of the cluster constraint include, but are not limited to, number of characters, size and orientation of characters, spacing between characters, aspect ratio and slope of characters. In FIG. 5, a first license plate example 500 includes a first license plate 502 that corresponds to a permissible license plate format in the state of California. In FIG. 6, a second license plate example 600 includes a second license plate 602 corresponds to a permissible license plate format in the United Kingdom. In the first license plate 502, the one or more clusters of characters correspond to a cluster 504, a cluster 506, and cluster a 508. Similarly, in the second license plate 602, the one or more clusters correspond to a cluster 604, a cluster 606, and a cluster 608. In an example, the clusters can be identified by detecting a hyphen. In an example, non-characters, such as a line break or word space can be considered. In an example, the LPDR system 102 uses machine learning to identify a set of possible character layouts and alignment to create clusters. For example, in the state of California, a standard license plate includes the phrase "California" in the first or top line, a string of characters in the second line, and the phrase "dmc.ca.gov" in the third line. Further, the string of characters follows the nomenclature 1ABC123. In another example, for license plates in the United Kingdom, the first two characters signify the state/city (e.g., in FIG. 6, "BD" signifies Birmingham) followed by a two digit vehicle age identifier (e.g., in FIG. 6, "51" represents September 2001), and lastly any three random characters. The LPDR system 102 can learn this layout/representation/alignment to accurately create one or more clusters of characters. In FIG. 7, a cluster 708 is detected for the plurality of filtered binarized images 706.

At 812, the LPDR system 102 recognizes a set of characters from the detected clusters 708. The recognition is made using a classifier that is based on supervised and/or unsupervised machine learning, and the classifier assigns a confidence rating to each recognized character of the set of characters. Using the classifier, the LPDR system 102 recognizes the characters in the license plate 710. The recognized characters are then saved to the database 210 for subsequent retrieval.

Figure 9:
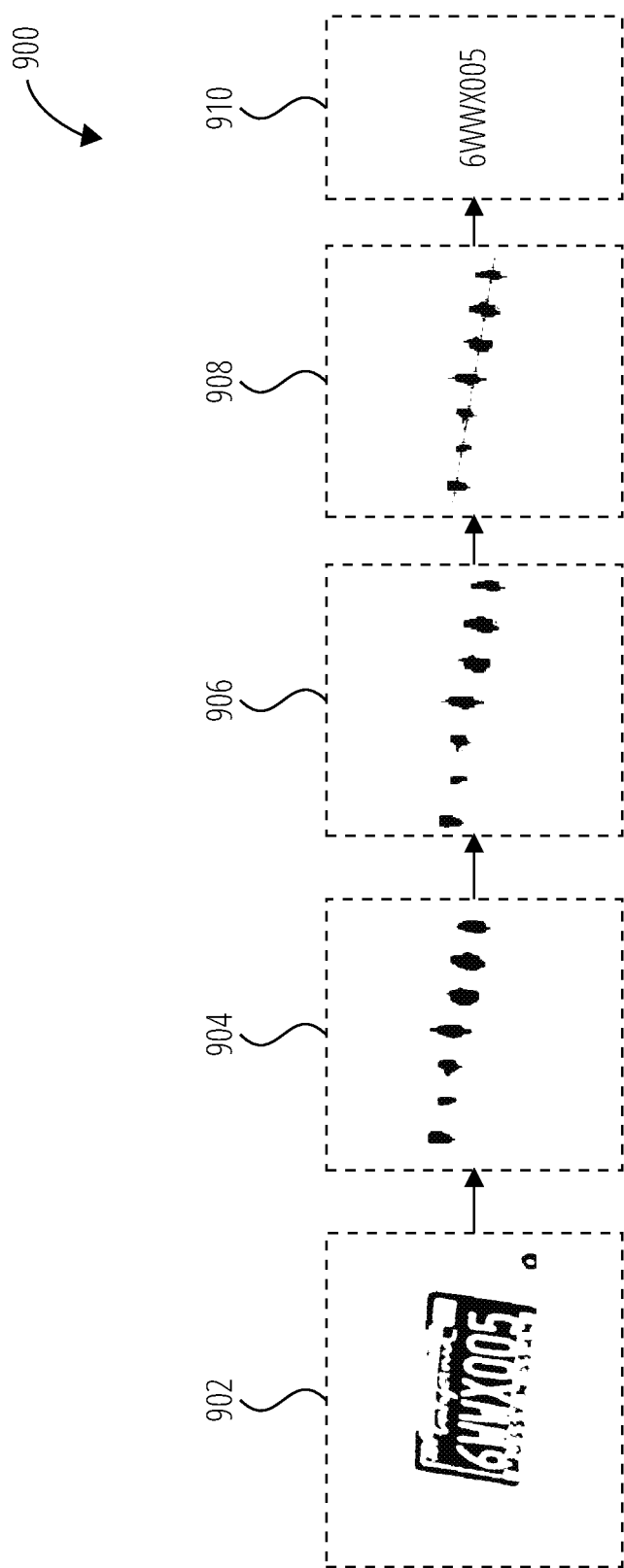
FIG. 9 illustrates a second example of a process for an LPDR system.
Figure 10:
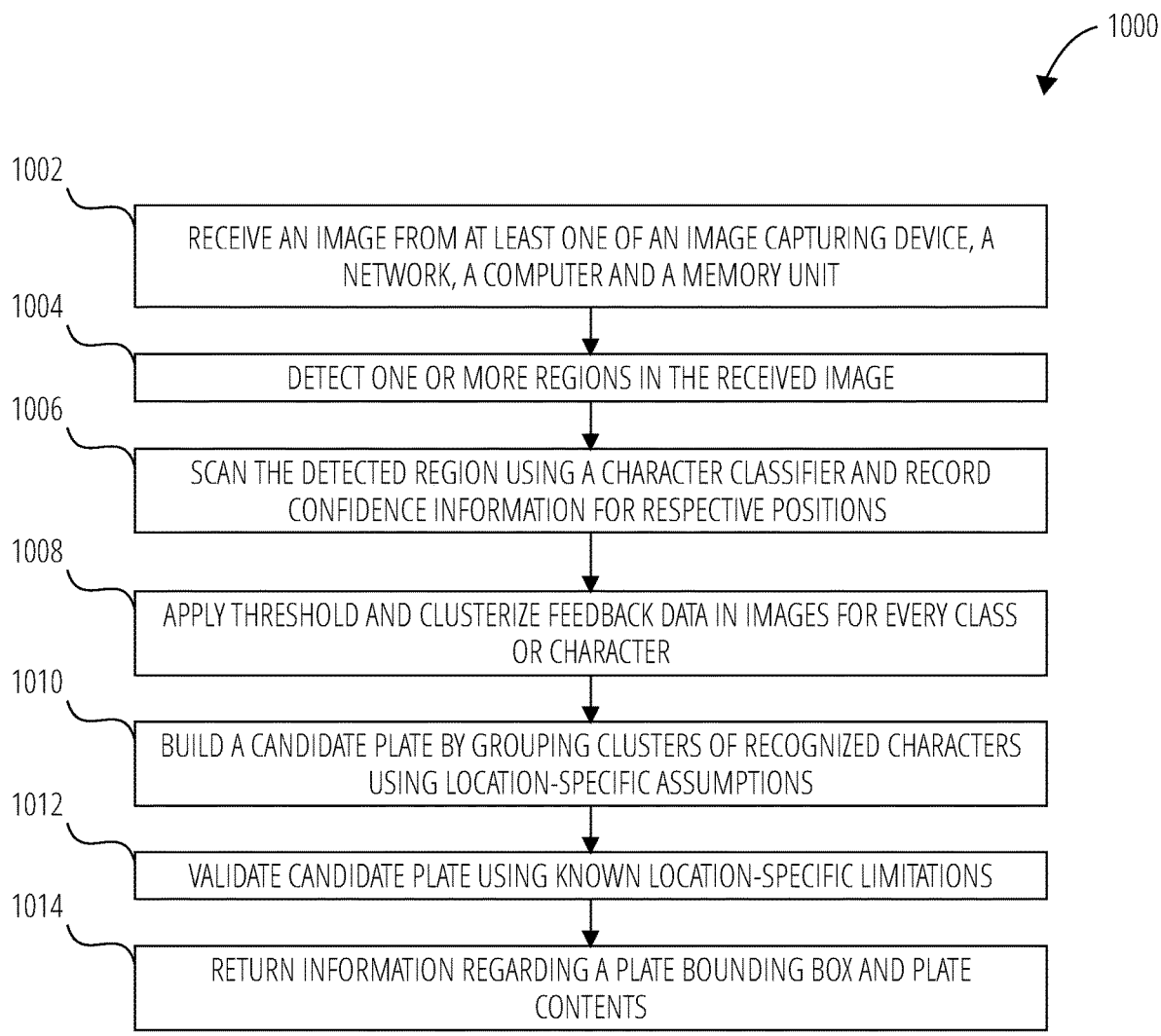
FIG. 10 illustrates an example of a second method for detecting and recognizing license plates.

FIG. 9 illustrates generally an example of a process for an LPDR system, such as can include or use the second example of a License Plate Detection and Recognition system from FIG. 3. FIG. 10 illustrates generally a second method 1000 for detecting and recognizing license plates, such as using one or more of the systems, devices, or units discussed herein. The second method 1000 will be discussed generally in conjunction with the example of FIG. 9.

In an example, at block 1002, the second method 1000 can include using the LPDR system 102 to receive an image to be analyzed. The image can be captured by one or more devices, such as an image capturing device, a network, a computer and a memory unit. In an example, the one or more devices may transfer a video stream instead of an image. For such cases, the LPDR system 102 divides the video stream into a sequence of frames. In an example, block 1002 can include receiving an image from the image input unit 202. In an example, block 1002 can include receiving the image 402 from the example of FIG. 4, such as can include information from a scene that can include at least one vehicle.

At block 1004, the second method 1000 can include using the LPDR system 102 to detect one or more regions in the image as-received at block 1002. For example, block 1004 can include using one or more units from the second LPDR 312 from the example of FIG. 3 to detect the regions. In an example, block 1004 can include identifying one or more vehicles in the received image 402 based on at least one of their shape, size, orientation, and motion. The techniques used for vehicle identification can be implemented using a Haar and Adaboost based cascade detector, a deformable part based model, Histogram of Gradients (HoG) and/or Support Vector Machine (SVM) based classifier, and the like. In an example, block 1004 can include analyzing the image 402 to distinguish an area corresponding to a license plate from a surrounding or adjacent area. For example, block 1004 can include identifying a bounded region such as can include the first image 902 from the example of FIG. 9, such as corresponding to a license plate.

At block 1006, the second method 1000 can include using the LPDR system 102 to scan the detected region (e.g., from block 1004) in the received image using a character classifier. The character classifier can include, for example, a CNN or machine learning-based classifier. In an example, block 1006 can include using the character scanning unit 304 to determine a confidence, on a per image unit basis, that a given image unit (e.g., a pixel, a cluster, or a group of pixels or clusters, etc.) represents a portion of a particular character. For example, block 1006 can include using the character scanning unit 304 to determine a probability of a presence of a particular character within a given image unit.

Block 1006 can include recording or populating character information and corresponding character confidence information in a first matrix. The first matrix can be an n-dimensional table or matrix and various positions (e.g., respective columns) in the matrix can represent respective actual or potential character locations on a license plate. The positions can include, for example, candidate characters and corresponding information from the classifier about a confidence that the candidate character is accurately identified. In an example, block 1006 can include performing character classification using multiple different input image resolution scales, such as corresponding to the same detected region that comprises a license plate.

Block 1008 can include applying a threshold, such as a confidence threshold, to values in the first matrix. The threshold value can be specified according to a desired detection sensitivity. In an example, a result from block 1008 can include a second matrix that retains only those values from the first matrix that meet or exceed the specified threshold. In an example, block 1006 and/or block 1008 can include using the character scanning unit 304 and/or the character extraction unit 306 from the example of the FIG. 3 to perform the character scanning, detection, recognition, and character extraction.

In an example, block 1008 can further include grouping or clusterizing feedback data in one or more images, such as for every class or character to be identified. After clusterization, if a particular area exhibits strong feedback for more than one class (e.g., the feedback information strongly indicates a plurality of potential characters), then class information for the area can be recorded in the second matrix in an ordered manner, such as according to a confidence of the recognition of the respective classes. In an example, if the input data to block 1008 includes data from multiple different resolutions or scales, then block 1008 can include using a scale where feedback is highest in terms of confidence and/or stability of the recognized characters.

At block 1010, the second method 1000 can include using the LPDR system 102 to build a candidate plate. For example, block 1010 can include using the plate build unit 308 such as by grouping clusters of recognized characters. In an example, block 1010 can include or use location-specific assumptions about an expected format, syntax or nomenclature for a plate to be detected. For example, block 1010 can include applying known information about expected contents of particular regions on a plate to inform or confirm assignment of recognized characters (see, e.g., the discussion of FIGS. 5 and 6 herein).

In an example, blocks 1006-1010 can correspond to the second, third, and/or fourth images 904, 906, and/or 908 in the example of FIG. 9. The images 904-908 illustrate generally a clusterization, arrangement, and recognition process that can be performed using the LPDR system 102. For example, the second image 904 can include processing the first image 902 to identify regions or sub-regions of a license plate that include or are likely to include discrete characters. The third image 906 illustrates generally a clusterization and/or threshold and/or recognition technique, and the fourth image 908 illustrates generally a grouping technique. One or more of the results from the clusterization and/or recognition can be used together to assemble a candidate plate.

At block 1012, the second method 1000 can include using the LPDR system 102 to validate a candidate plate from block 1010. In an example, block 1012 can include or use the same or different location-specific assumptions or limitations as applied in block 1010 to validate a candidate plate. In an example, block 1012 includes retrieving or receiving the location-specific limitations automatically from a remote repository of license plate rules or formats. At block 1014, the LPDR system 102 can be configured to return information about a recognized plate to another system. For example, block 1014 can include returning information about a plate bounding box (e.g., coordinates in an image, such as can correspond to a particular geographic location) or can include returning information about contents of a recognized license plate. In an example with reference to FIG. 9, block 1014 can include reporting the contents "6WWX005" of a validated plate 910. The validated plate 910 can correspond to the first image 902 provided to and analyzed by the LPDR system 102.

The LPDR system 102 or any of its units, may be embodied in the form of a computer system. Typical examples of a computer system include a general-purpose computer, a programmed microprocessor, a micro-controller, a peripheral integrated circuit element, and other devices or arrangements of devices that are capable of implementing the systems and methods discussed herein. A unit, module, device, system, or the like, discussed herein can refer to a computer, processor, or other circuit-implemented hardware or software, or combination thereof.

A computer system can include, among other things, a computer, an input device, a display device, and can be coupled to a network such as the Internet. The computer further comprises a microprocessor. The microprocessor is connected to a communication bus. The computer also includes a memory. The memory may include Random Access Memory (RAM) and Read Only Memory (ROM).

The computer system further comprises a storage device. The storage device can be a hard disk drive or a removable storage drive such as a floppy disk drive, optical disk drive, etc. The storage device can also be other similar means for loading computer programs or other instructions into the computer system. The computer system also includes a communication unit. The communication unit allows the computer to connect to other databases and the Internet through an I/O interface. The communication unit allows the transfer as well as reception of data from other databases. The communication unit may include a modem, an Ethernet card, or any similar device which enables the computer system to connect to databases and networks such as LAN, MAN, WAN and the Internet. The computer system facilitates inputs from a user through input device, accessible to the system through I/O interface.

The computer system executes a set of instructions that is stored in one or more storage elements, in order to process input data. The storage elements may also hold data or other information as desired. The storage element may be in the form of an information source or a physical memory element present in the processing machine.

The set of instructions may include one or more commands that instruct the processing machine to perform specific tasks. The set of instructions may be in the form of a software program. Further, the software may be in the form of a collection of separate programs, a program module with a larger program or a portion of a program module. The software may also include modular programming in the form of object-oriented programming. The processing of input data by the processing machine may be in response to user commands, results of previous processing or a request made by another processing machine.

Embodiments described in the present disclosure can be implemented by any system having a processor and a non-transitory storage element coupled to the processor, with encoded instructions stored in the non-transitory storage element. The encoded instructions when implemented by the processor configure the system to detect and recognize license plates discussed above in FIGS. 1-10. The systems shown in FIGS. 1-3 can practice all or part of the discussed methods or portions thereof, can be a part of the recited systems, and/or can operate according to instructions in the non-transitory storage element. The non-transitory storage element can be accessed by a general purpose or special purpose computer, including the functional design of any special purpose processor. Few examples of such non-transitory storage element can include RAM, ROM, EEPROM, CD-ROM or other optical disk storage or other magnetic. The processor and non-transitory storage element (or memory) are known in the art, thus, any additional functional or structural details are not required for the purpose of the current disclosure.

To better illustrate the methods, systems, devices, and apparatuses discussed herein, a non-limiting list of aspects is provided here.

Aspect 1 can include or use subject matter such as a license plate detection, recognition, and validation system. In Aspect 1, the system can include, among other things, a processor circuit and a non-transitory memory coupled to the processor circuit. The memory can include instructions that, when executed by the processor circuit, cause the system to identify (e.g., using a license plate region detection unit) a first region in a first received image, the first region corresponding to a license plate of a vehicle, and the first received image obtained from an image capture device located in a first geographic location or jurisdiction that provides or maintains rules pertaining a layout or content of a license plate. The instructions can further cause the system to identify (e.g., using a character identification unit) one or more alphanumeric characters in the first region of the first received image corresponding to the license plate, and generate (e.g., using a plate build unit) a candidate license plate using the identified one or more alphanumeric characters from the character identification unit. In an example, the instructions to generate the candidate license plate include instructions to use a location-specific template that corresponds to the first geographic location.

Aspect 2 can include, and can optionally be combined with the subject matter of Aspect 1 to include, in the memory, instructions that, when executed by the processor circuit, cause the system to validate (e.g., using a license plate verification unit) the candidate license plate, for example, by applying location-specific rules to the candidate license plate to generate a validation result, the validation result indicating a likelihood that the candidate license plate corresponds to a valid license plate for the first geographic location.

Aspect 3 can include, and can optionally be combined with any one or more of Aspects 1 or 2 to include instructions to populate a matrix corresponding to the location-specific template, wherein each of multiple character positions in the template corresponds to a respective portion of the matrix, and one or more entries in the matrix comprise confidence information about the identified one or more alphanumeric characters in the first region of the first received image.

Aspect 4 can include, and can optionally be combined with the subject matter of Aspect 3 to include instructions to determine whether the one or more entries in the matrix meet a specified threshold condition.

Aspect 5 can include, and can optionally be combined with any one or more of Aspects 1-4 to include instructions to identify the one or more alphanumeric characters at each of multiple different resolution scales of the first received image.

Aspect 6 can include, and can optionally be combined with the subject matter of Aspect 5 to include instructions to populate a matrix corresponding to the location-specific template, wherein each of multiple character positions in the template corresponds to a respective portion of the matrix, and entries in the matrix comprise information about the identified one or more alphanumeric characters for the multiple different resolution scales.

Aspect 7 can include, and can optionally be combined with the subject matter of Aspect 6 to include, for each of the multiple character positions, the matrix having entries that are prioritized according to respective confidences in validity of the respective identified characters.

Aspect 8 can include, and can optionally be combined with any one or more of Aspects 1-7 to include instructions to identify clusters of characters and/or boundaries of one or more character clusters in the first region of the first received image.

Aspect 9 can include, and can optionally be combined with any one or more of Aspects 1-8 to include, in the memory, instructions that, when executed by the processor circuit, cause the system to send the identified one or more alphanumeric characters to a post-processor for temporal validation, and the post-processor can be configured to analyze placement of the characters across multiple image frames.

Aspect 10 can include, and can optionally be combined with the subject matter of Aspect 9 to include, in the memory, instructions that, when executed by the processor circuit, cause the system to compute a weighted probability for two or more of the alphanumeric characters by multiplying a confidence indicator by a number of frames that recognized the character divided by a total number of frames considered for each of multiple character possibilities, and then validate the character (or validate a license plate comprising the character) with the higher weighted probability.

Aspect 11 can include, and can optionally be combined with the subject matter of Aspect 9 to include the post-processor being configured to analyze the characters across multiple image frames and discard one or more characters that indicate a different alignment or placement in a minority of the frames.

Aspect 12 can include or use subject matter such as a license plate detection and recognition system with temporal validation. Aspect 12 can include, or can optionally be combined with the subject matter of one or more of Aspects 1-11. In an example, Aspect 12 can include a processor circuit and a memory circuit coupled to the processor circuit. In Aspect 12, the memory circuit can include instructions that, when executed by the processor circuit, configure the system to detect one or more regions corresponding a character within one and/or a plurality of captured or stored image frames comprising a license plate of a detected vehicle detect one or more clusters of characters in each of the detected regions and, within each detected cluster, identify one or more candidate alphanumeric characters, and send the identified characters to a post-processor for temporal validation, wherein the post-processor is configured to analyze relative placement of the identified characters across a plurality of image frames. In an example, the post-processor can be configured to compute a weighted probability for the candidate characters with an ambiguity, the ambiguity indicating at least two different candidates for the same region, and validate the character with the higher weighted probability, thereby resolving the ambiguity.

Aspect 13 can include, and can optionally be combined with the subject matter of Aspect 12 to include instructions to compute the weighted probability, for each of the at least two different candidates, by multiplying a confidence value in percentage by a number of frames that recognized the character divided by a total number of frames considered.

Aspect 14 can include, and can optionally be combined with the subject matter of Aspect 13 to include the post-processor being configured to discard from its analysis characters that are identified as having a different alignment or different placement in a minority of frames.

Aspect 15 can include, and can optionally be combined with any one or more of Aspects 12-14 to include receiving the image frames from at least one of an image capturing device, a network, and a memory circuit.

Aspect 16 can include, and can optionally be combined with any one or more of Aspects 12-15 to include instructions that configure the processor circuit to detect the one or more regions in the image using at least one of an identified color, an identified edge, a transition in edges, a shape, a size, an orientation, a Histogram of Gradients (HoGs) and a machine-learning based classifier.

Aspect 17 can include or use subject matter such as a method, such as can include or use a license plate detection and recognition system, such as with or without temporal validation, such as described in any one or more of Aspects 1-16. In an example, Aspect 17 can include identifying, using a processor circuit, a first region in a first received image, the first region corresponding to a license plate of a vehicle, and the first received image obtained from a camera disposed in a first geographic location, and identifying, using the processor circuit, one or more alphanumeric characters in the first region identified in the first received image, and generating, using the processor circuit, a candidate license plate using the identified one or more alphanumeric characters. In Aspect 17, generating the candidate license plate can include using a location-specific template that corresponds to the first geographic location.

Aspect 18 can include, and can optionally be combined with the subject matter of Aspect 17 to include validating the candidate license plate by applying location-specific (e.g., geographically based) rules to the candidate license plate to generate a validation result, the validation result indicating a likelihood that the candidate license plate corresponds to a valid license plate for the first geographic location.

Aspect 19 can include, and can optionally be combined with any one or more of Aspects 17 and 18 to include generating the candidate license plate, including populating a matrix corresponding to the location-specific template, and each of multiple character positions in the template corresponds to a respective portion of the matrix, and one or more entries in the matrix comprise confidence information about the identified one or more alphanumeric characters in the first region of the first received image.

Aspect 20 can include, and can optionally be combined with any one or more of Aspects 17-19 to include identifying the one or more alphanumeric characters in the first region, including processing information from the first region in the first received image using a convolutional neural network-based classifier to generate classification results that comprise respective confidence indications for multiple characters of the license plate of the vehicle, and providing the one or more alphanumeric characters based on the classification results.

Each of these Aspects 1-20 can be used alone or combined in various combinations and permutations.

The above detailed description includes references to the accompanying drawings, which form a part of the detailed description. The drawings show specific embodiments by way of illustration. These embodiments are also referred to herein as "examples." Such examples can include elements in addition to those shown or described. Moreover, the subject matter may include any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. In the above Detailed Description, various features may be grouped together to streamline the disclosure. This should not be interpreted as intending that an unclaimed disclosed feature is essential to any claim. Rather, the subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope should be determined with reference to the appended claims, along with the full scope of equivalents to which such claims are entitled.

What is claimed is:

1. A license plate detection and recognition system with temporal validation, the system comprising:
   a processor circuit; and
   a memory circuit coupled to the processor circuit, the memory circuit including instructions that, when executed by the processor circuit, configure the system to:
   detect one or more regions within one and/or a plurality of captured or stored image frames comprising a license plate of a detected vehicle;
   detect one or more clusters of characters in each of the detected regions and, within each detected cluster, identify one or more candidate alphanumeric characters;
   send the identified characters to a post-processor for temporal validation, wherein the post-processor is configured to analyze relative placement of the identified characters across a plurality of image frames;
   compute a weighted probability using respective confidence values for the candidate characters with an ambiguity, the ambiguity indicating at least two different candidates for the same region; and
   validate the character with the higher-weighted probability to resolve the ambiguity;
   wherein the instructions to compute the weighted probability include instructions to, for each of the at least two different candidates, multiply the respective confidence value in percentage by a number of frames that recognized the character divided by a total number of frames considered.

2. The system of claim 1, wherein the post-processor is configured to discard from its analysis characters that are identified as having a different alignment in a minority of frames.

3. The system of claim 1, wherein the post-processor is configured to discard from its analysis characters that are identified as having a different placement in a minority of frames.

4. The system of claim 1, further comprising receiving the image frames from at least one of an image capturing device, a network, and a memory circuit.

5. The system of claim 1, further comprising instructions that configure the processor circuit to detect the one or more regions in the image using at least one of an identified color, an identified edge, a transition in edges, a shape, a size, an orientation, and a Histogram of Gradients (HoGs).

6. The system of claim 1, further comprising instructions that configure the processor circuit to detect the one or more regions in the image using a machine learning-based classifier.

7. The system of claim 1, wherein the instructions to identify one or more candidate alphanumeric characters include instructions to:
   generate a candidate license plate using the identified candidate alphanumeric characters and using a license plate template that corresponds to a geographic location of the detected vehicle, wherein the license plate template indicates a particular number or orientation of characters that are expected in the candidate license plate.

8. The system of claim 7, wherein the instructions to generate the candidate license plate include instructions to:
   select the license plate template based on the geographic location of the detected vehicle;
   apply a classification algorithm to populate a matrix of normalized confidence indicators corresponding to the candidate alphanumeric characters; and
   use a confidence threshold and the matrix of confidences to build the candidate license plate by selecting particular characters for each of the candidate alphanumeric characters that satisfies the confidence threshold.

9. The system of claim 7, wherein the license plate template includes information about a likelihood of particular characters comprising the characters of the license plate of the detected vehicle.

10. A method for license plate character recognition, the method comprising:
    using a first processor, detecting one or more regions within respective image frames, wherein each of the frames comprises information about a license plate of a particular vehicle;
    using the first processor, detecting one or more clusters of characters in each of the detected regions and, within each detected cluster, identifying one or more candidate alphanumeric characters;
    using a validation processor, determining relative placement information about the identified candidate alphanumeric characters across the image frames to identify one or more frames to discard and one or more frames to retain;
    using the validation processor and the candidate alphanumeric characters corresponding to the retained frames, computing a weighted probability for the candidate alphanumeric characters with an ambiguity, the ambiguity indicating at least two different candidate characters for the same region; and
    providing a character validation result by validating a particular candidate character with a higher-weighted probability to resolve the ambiguity.

11. The method of claim 10, wherein computing the weighted probability includes, for each of the at least two different candidate characters, multiplying a confidence value in percentage by a number of frames that recognized the character, divided by a total number of frames considered.

12. The method of claim 11, including discarding frames with candidate characters that are identified as having an abnormal alignment in a minority of frames.

13. The method of claim 11, including discarding frames with candidate characters that are identified as having an abnormal placement in a minority of frames.

14. The method of claim 10, further comprising receiving the image frames from at least one of an image capturing device, a network, and a memory circuit.

15. The method of claim 10, further comprising detecting the one or more regions within the respective image frames using at least one of an identified color, an identified edge, a transition in edges, a shape, a size, an orientation, a Histogram of Gradients (HoGs), and a machine learning-based classifier.

16. The method of claim 10, wherein identifying one or more candidate alphanumeric characters includes generating a candidate license plate using a license plate template that corresponds to a geographic location of the particular vehicle, wherein the license plate template indicates a particular number or orientation of characters that are expected in the candidate license plate.

17. The method of claim 16, wherein generating the candidate license plate includes:
  selecting the license plate template based on the geographic location of the particular vehicle;
  applying a classification algorithm to populate a matrix of normalized confidence indicators corresponding to the candidate alphanumeric characters; and
  using a confidence threshold and the matrix of confidences, building the candidate license plate by selecting particular characters for each of the candidate alphanumeric characters that satisfy the confidence threshold.

18. A license plate detection and recognition system with temporal validation, the system comprising:
  a processor circuit; and
  a memory circuit coupled to the processor circuit, the memory circuit including instructions that, when executed by the processor circuit, configure the system to:
  detect one or more regions within respective image frames, wherein each of the frames comprises information about a license plate of a particular vehicle;
  detect one or more clusters of characters in each of the detected regions of each frame and, within each detected cluster, identify one or more candidate alphanumeric characters;
  provide the identified characters to a post-processor for temporal validation, wherein the post-processor is configured to use relative placement information about the candidate alphanumeric characters from across a plurality of the image frames and select one or more frames to discard based on abnormal alignment or placement of one or more of the candidate alphanumeric characters;
  compute a weighted probability for the candidate alphanumeric characters with an ambiguity characteristic that indicates multiple candidates for the same region; and
  validate a particular one of the multiple candidates based on the candidate character with the higher-weighted probability.

19. The system of claim 18, wherein the instructions to compute the weighted probability include instructions to, for each of the multiple candidates for the same region, multiply a confidence value in percentage by a number of frames that recognized the same character divided by a total number of frames considered.

* * * * *